United States Patent [19]

Toyama

[11] 4,231,072

[45] Oct. 28, 1980

[54] RECORD/PLAYBACK DEVICE FOR MAGNETIC RECORDING

[75] Inventor: Akira Toyama, Shimosuwa, Japan

[73] Assignee: Kabushiki Kaisha Sankyo Seiki Seisakusho, Shimosuwa, Japan

[21] Appl. No.: 889,802

[22] Filed: Mar. 24, 1978

[30] Foreign Application Priority Data

Mar. 30, 1977 [JP] Japan .......................... 52-39168[U]
Sep. 8, 1977 [JP] Japan ......................... 52-120889[U]

[51] Int. Cl.² .................. G11B 5/80; G11B 19/16; G11B 25/04
[52] U.S. Cl. .......................................... 360/88; 360/2; 360/130.2
[58] Field of Search ............ 360/88, 2, 131, 130, 360/130.2; 235/61.11 D, 61.11 R, 61.12 M, 493, 449, 479, 483

[56] References Cited

U.S. PATENT DOCUMENTS

| Re. 29,159 | 3/1977 | Krotous et al. | 360/88 |
|---|---|---|---|
| 3,404,894 | 10/1968 | Kral | 360/88 |
| 3,488,867 | 1/1970 | Lyon et al. | 360/2 |
| 3,813,521 | 5/1974 | Kral | 360/88 |
| 3,855,619 | 12/1974 | Kral et al. | 360/88 |
| 3,869,718 | 3/1975 | Schmidt | 360/88 |
| 3,953,887 | 4/1976 | Kobylarz | 360/2 |

Primary Examiner—Alfred H. Eddleman
Attorney, Agent, or Firm—James Creighton Wray

[57] ABSTRACT

The present invention relates to a record/playback device for magnetic recording of manual drive type in which information can be exchanged while a magnetic card is manually being driven. In the device according to the present invention a write-only magnetic head and a read-only magnetic head are provided in a magnetic card path formed within the device. Writing of information into the magnetic card is done by said write-only head, while reading of information out of the magnetic card is done by said read-only head. Of these two magnetic heads, the one for write-in is located at a specific height above the fixed card guide formed at the deepest end of the magnetic card path, while the one for read-out is located at a greater height than the one for write-in. Between these two heads there is provided a movable card guide which is free to move along the magnetic card path. When the movable card guide goes into the magnetic card path, the magnetic card guide surface of the movable card guide runs parallel to the magnetic card guide surface of the fixed card guide. Thus when a magnetic card runs along the fixed card guide, information is written into this magnetic card. When it runs along the movable card guide, information is read out of it.

19 Claims, 14 Drawing Figures

RECORD/PLAYBACK DEVICE FOR MAGNETIC RECORDING

BACKGROUND OF THE INVENTION

In a record/playback device for magnetic recording of manual drive type, a magnetic card is provided with a timing signal area as well a record/playback area.

And in said record/playback device the magnetic card path faces a read-out/write-in magnetic head as well as a read-out magnetic head. In recording and playback, said read-out/write-in head slides in contact with said record/playback area, while said read-out head slides in contact with said timing signal area. Thus, in response to a clock pulse given from said read-out magnetic head, said read-out/write-in head records or plays back information in the record/playback area of the magnetic card.

Therefore in such a device, said read-out/write-in device becomes structurally complicated and at the same time its control circuit becomes unavoidably complicated.

Meanwhile, for the purpose of preventing erroneous-cancelling of record, a microswitch or a photosensor which detects a notch provided at a specific position of a magnetic card is installed in the magnetic card path of the record/playback device. When a notched card comes into the magnetic card path, said microswitch or photosensor detects the notch and thereupon an electric signal issued from said microswitch or photosensor causes supply of an electric current for write-in to the magnetic head to be stopped.

Such an anti-cancel system, calling for a control circuit as well as for a notch-sensing means like a microswitch or a photosensor, naturally has a complicated structure.

Moreover, a magnetic card can freely pass over the magnetic head in the magnetic card path even when a write-in stop signal is being issued from the notch-sensing means; therefore if for some cause the magnetic head happens to be in a write-in mode, the magnetic card passing over the head is likely to be written in.

OBJECTS OF THE INVENTION

The object of the present invention is to provide a record/playback device for magnetic recording in which the magnetic head itself and its control circuit have been simplified by adoption of a read-only magnetic head for reading out magnetic record and a write-only magnetic head for writing in information.

Another object of the present invention is to provide a record/playback device for magnetic recording in which in addition to the fixed card guide a movable card guide is installed to prevent an erroneous write-in or read-out of information.

Still another object of the present invention is to provide a record/playback device for magnetic recording in which the movable card guide is selectively driven by, say, a solenoid, thereby preventing a recorded information from being erroneously canceled.

Still another object of the present invention is to provide a record/playback device for magnetic recording in which an erroneous write-in of the magnetic card while information is being read out of it can be reliably prevented.

Still another object of the present invention is to provide a record/playback device for magnetic reading in which information can be written in with a constant density even if the card-drive speed changes.

Still another object of the present invention is to provide a record/playback device for magnetic reading in which the interchangeability of magnetic card is great.

Still another object of the present invention is to provide a record/playback device for magnetic reading in which a read-only magnetic head and a write-only magnetic head are independent units and therefore the track width of each head can be selected arbitrarily.

Still another object of the present invention is to provide a record/playback device for magnetic recording which is equipped with an anti-cancel function which mechanically engages a magnetic card erroneously inserted despite a write-in mode and thereby prevents the card from getting into the magnetic card path.

Other and further objects of the present invention will become obvious upon an understanding of the illustrative embodiments to be described or indicated in the appended claims; and various advantages not mentioned herein will occur to anyone skilled in the art upon employment of the invention in practice.

DETAILED DESCRIPTION

Figure 1:
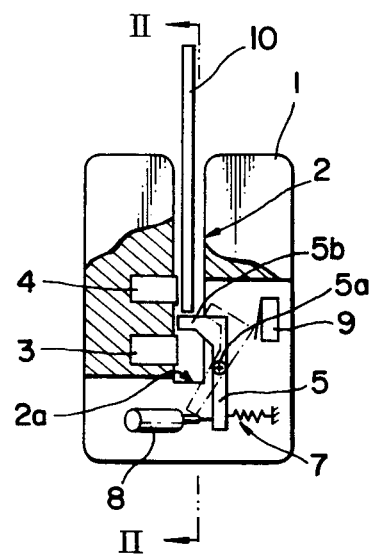
FIG. 1 is a partially sectional plan view of the first embodiment of the present invention.
Figure 2:
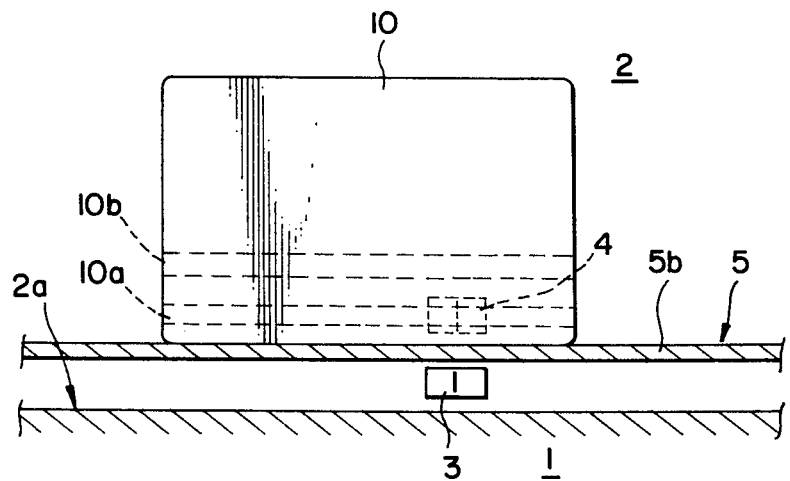
FIG. 2 is a sectional view of the main parts along II—II in FIG. 1.

In FIGS. 1 and 2 showing the first embodiment of the present invention, the magnetic card path 2 is formed in the body 1 of the device. The fixed card guide 2a is formed at the end of the magnetic card path 2, while on one side of said path 2 there are arranged therein the write-only magnetic head 3 and the read-only magnetic head 4 with specific spacing between them. Near the magnetic card path 2 in the body 1 the movable card guide 5 is provided rotatable around the support point 5a. One end 5b of the movable card guide 5 can pop in or out of the path 2 as said guide 5 turns. Between the other end of said guide 5 and the fixed part of said body 1 there is inserted the tensile coil spring 7, which normally urges said guide 5 to turn counterclockwise. At the other end of said guide 5 the solenoid 8 is connected in opposition to said spring 7. When the solenoid 8 is energized, said guide 5 turns clockwise overcoming the force of said spring 7 and thus said guide 5 pops out of the path 2.

9 is an on-off limit switch to be worked by the end of said guide 5. A signal issued from this limit switch 9 selectively sets the device 1 on a write-in mode or on a read-out mode, thereby preventing an erroneous writing or erasing in the device 1.

The magnetic card 10 holds a record/playback area 10a as well as a timing signal area 10b, which are separated by a specific spacing. Said specific spacing is equal to the head gap between the magnetic head 3 and the magnetic head 4.

Now the working in the first embodiment is to be described.

When a recorded information is to be read out of the record/playback area 10a, the card 10 is put into the card path 2 with the solenoid 8 remaining de-energized. Then with the card 10 driven along the movable card guide 5, the record/playback area 10a of said card 10 slides in contact with the read-only head 4, whereby the recorded information can be read out.

When an information is to be written into the card 10, the solenoid 8 is energized; the movable card guide 5 is put out of the card path 2; and instead the card 10 is inserted to be driven therein. Then the card 10 runs along the card guide 2a. Thereby with the magnetic head 3 sliding in contact with the record/playback area 10a and the magnetic head 4 sliding in contact with the timing signal area 10b, in accordance with the timing signal issued from the magnetic head 4 the record/playback area 10a records the information at a constant density regardless of the card drive speed.

Figure 3:
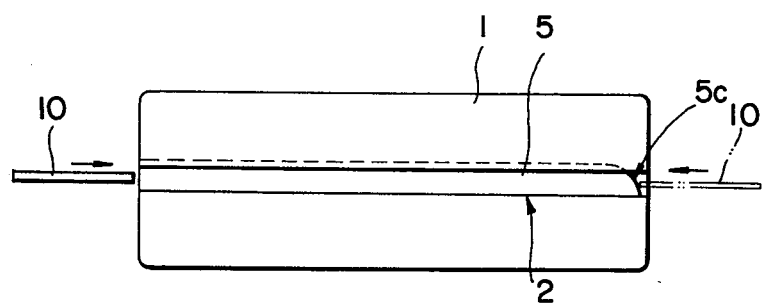
FIG. 3 is a plan view of the second embodiment of the present invention.
Figure 4:
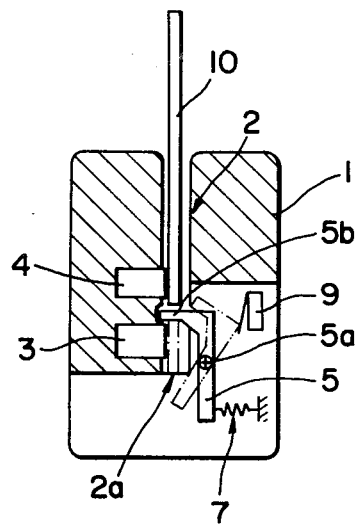
FIG. 4 is a partially sectional right side view of FIG. 3.

FIGS. 3 and 4 illustrate the second embodiment of the present invention. In FIGS. 3 and 4 like numbers denote like members in FIGS. 1 and 2. The feature of this embodiment lies in that a solenoid to drive the movable card guide 5 is absent and instead a beveled part 5c to guide the card is provided at one end of the card guide 5.

In the embodiment illustrated in FIGS. 3 and 4 when an information is to be read out of the card 10, the card 10 is put at the end 5b of the card guide 5 and it is driven along the movable card guide 5. When an information is to be written into the card 10, the card 10 is driven over the fixed card guide 2a in the card path 2, whereby the tip of the card 10 pushes the beveled part 5c of the movable card guide 5; thereby the force of the card 10 being pushed puts the card guide 5 out of the card path 2.

Thus in the two examples illustrated in FIGS. 1 to 4, on account of the read-only head and the write-only head being employed, anything structurally complicated such as a read-out/write-in head can be dispensed with and accordingly with no switch circuit needed, the device can be simplified.

Meanwhile, since mutually independent units, i.e., the read-only head and the write-only head are employed, the interchangeability of the magnetic card can be increased by making the track of the write-only head wide and the track of the read-only head narrow.

Furthermore, since the card in time of reading runs along the upper, card guide 5, there is no likelihood of information being erroneously written into the card.

Figure 5:
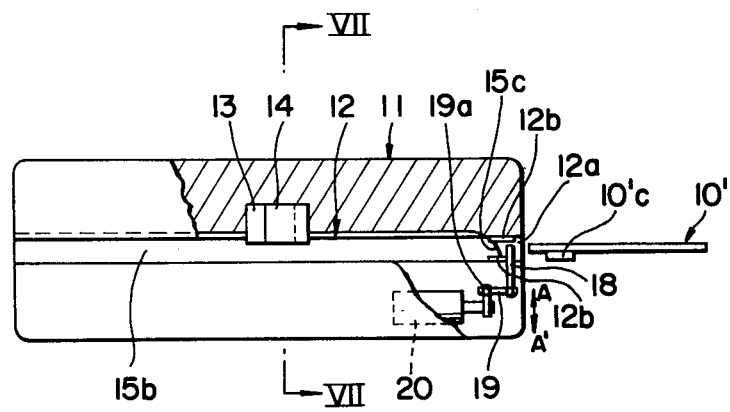
FIG. 5 is a partially sectional plan view of the third embodiment of the present invention.
Figure 6:
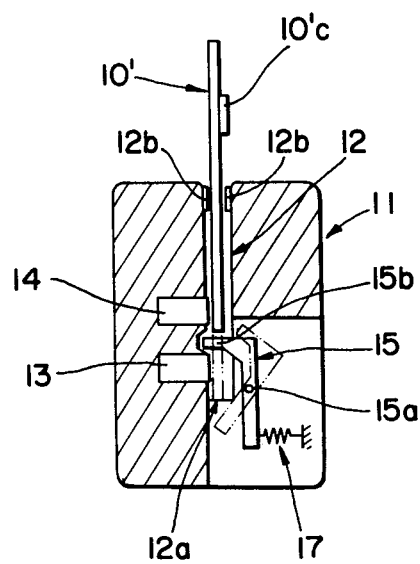
FIG. 6 is a sectional view along VI—VI of FIG. 5.
Figure 7:
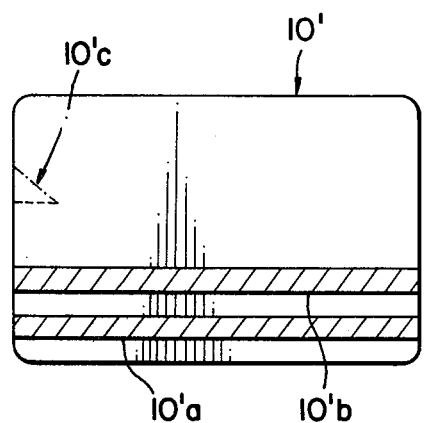
FIG. 7 is a plan view of a magnetic card.

FIGS. 5 and 6 illustrate the third embodiment of the present invention. This embodiment features an expansion of the anti-cancel function in the record/playback device in the first and second embodiments. The device 11 has a magnetic card path 12 formed therein. At the end of said magnetic card path 12 is formed the fixed card guide 12a and on one side of said path 12 are arranged the write-only magnetic head 13 and the read-only magnetic head 14 spaced from each other, facing said path 12. Near the magnetic card path 12 in the device 11 there is provided a movable card guide 15 rotatably around the support point 15a.

One end 15b of said movable card guide 15 can pop in or out of said path 12 with a turning of said guide 15. At the other end of said guide 15 there is inserted a tensile coil spring 17 which normally urges said guide 15 to turn counterclockwise in FIG. 6. 15c denotes a card-introduce notch.

At the entrance to the card path 12 a card-reject control member 18 is provided at the same level as the end 15b of said movable card guide 15 slidably in the direction A-A'. One end of said control member 18 is connected through a rotatable lever 19 to the movable core of a solenoid 20. Said rotatable lever 19 is rotatable around the pivot 19a. Thus when the solenoid 20 is energized, the rotatable lever 19 turns clockwise around the pivot 19a, and in consequence the control member 18 is withdrawn out of the card path 12. Since the solenoid 20 is energized when the device 11 is in the write-in mode, the control member 18 is out of the card path 12. When the device 11 is in the read-out mode, the solenoid 20 is de-energized and accordingly the control member 18 is projecting in the card path 12. Meanwhile at the card entrance to the card path 12 there are card-reject bosses 12b,12b formed in opposition to each other.

Figure 8:
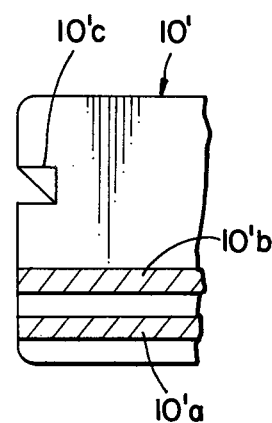
FIG. 8 is a plan view of the principal part of the magnetic card in FIG. 7 which is provided with an anti-cancel projection.
Figure 9:
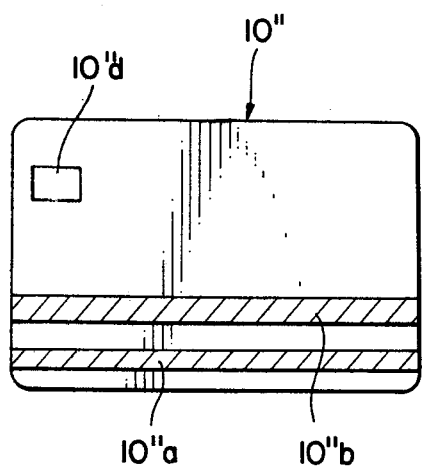
FIG. 9 is a plan view of another magnetic card provided with an anti-cancel projection.
Figure 10:
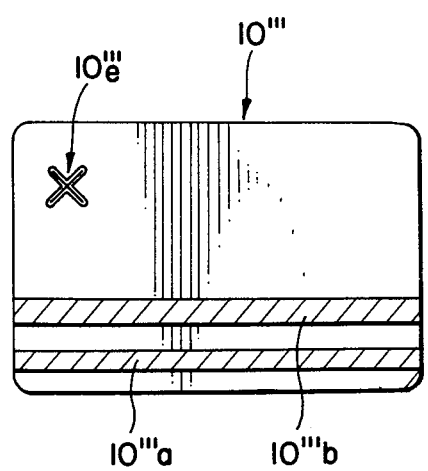
FIG. 10 is a plan view of still another magnetic card provided with an anti-calcel projection.

On the magnetic card 10' there are the record/playback area 10'a and the timing signal area 10'b provided with a specific spacing from each other. This spacing equals the head gap between the magnetic head 13 and the magnetic head 14. At the tip of the magnetic card 10' there is a notched foldable part 10'c, which, when folded back as shown in FIG. 8, forms a projection. This foldable part 10'c may, as indicated in FIGS. 9 and 10, be replaced by a thick tape 10"d or an emboss 10"e respectively formed on the card 10" or 10''' with the same effect. In FIGS. 9 and 10, 10"a, 10'''a are the record/playback areas and 10"b, 10'''b are the timing signal areas.

The function in the third embodiment is illustrated as follows.

When an information recorded on the record/playback area 10'a of a magnetic card 10' is to be read out, the magnetic card 10' is put into the card path 12 with the solenoid 20 deenergized. Then on account of the presence of the control member 18 the magnetic card 10' can be driven only along the movable card guide 15 and the record/playback area 10'a of the card 10' in sliding contact with the read-only magnetic head 14 can read out the information.

If, however, the device 11 is in the write-in mode, the solenoid 20 will remain energized and accordingly the control member 18 is out of the card path 12. Therefore when a magnetic card 10' is put in to be driven along, the card will run along the card guide 2a but on account of the boss 10'c formed on the card 10', even if the control member 18 is out of the card path 12, said boss 10'c (or 10"d, 10'''e) of the card 10' which hits against the card-reject boss 12b formed in the path 12 will prevent the card 10' from moving farther in the card path 12.

Thus in the third embodiment any card erroneously put in will be mechanically stopped before reaching the magnetic head with a reliable effect of preventing the recorded information from being erroneously canceled. Meanwhile an operator handling a card can be immediately aware of his mistake, and the mechanical stopping of the card makes the circuit extremely simple.

It is important in the third embodiment that the read-only head 14 is located slightly closer to the card-entry side than the write-only head. Under this arrangement, when an information is to be written into the card 10', the timing signal area 10'b of the card 10' is set in sliding contact with the read-only head 14 to yield a timing signal; and, referring to the timing signal thus given, the write-only head 13 records the information on the record/playback area 10'a with a constant density. For this reason, there is a risk of erroneous entry unless the timing signal is available shortly before the write-only head 13 starts to record an information.

Figure 11:
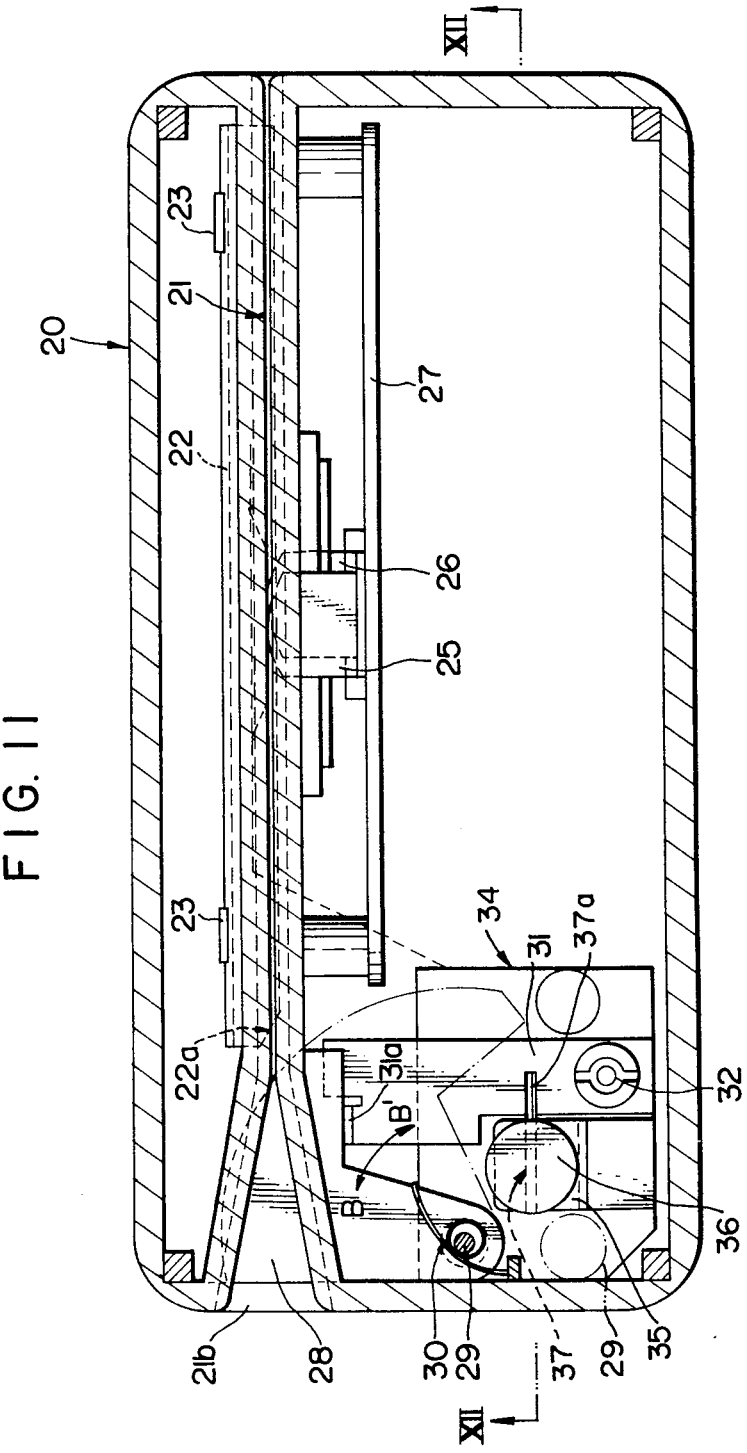
FIG. 11 is a sectional view of the fourth embodiment of the present invention.
Figure 12:
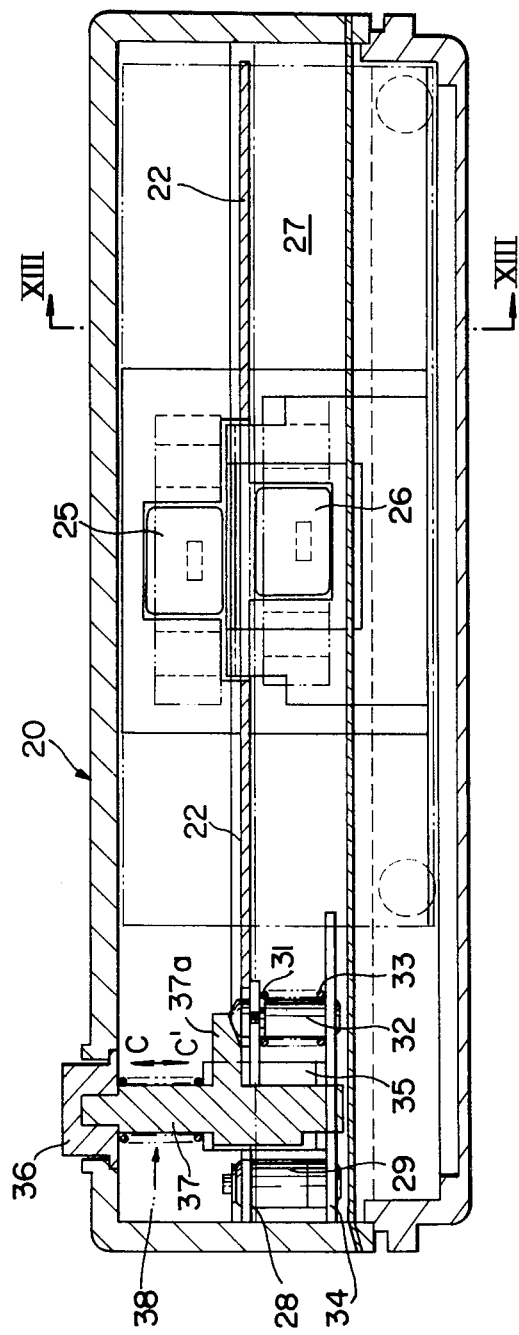
FIG. 12 is a sectional view along XII—XII of FIG. 11.
Figure 13:
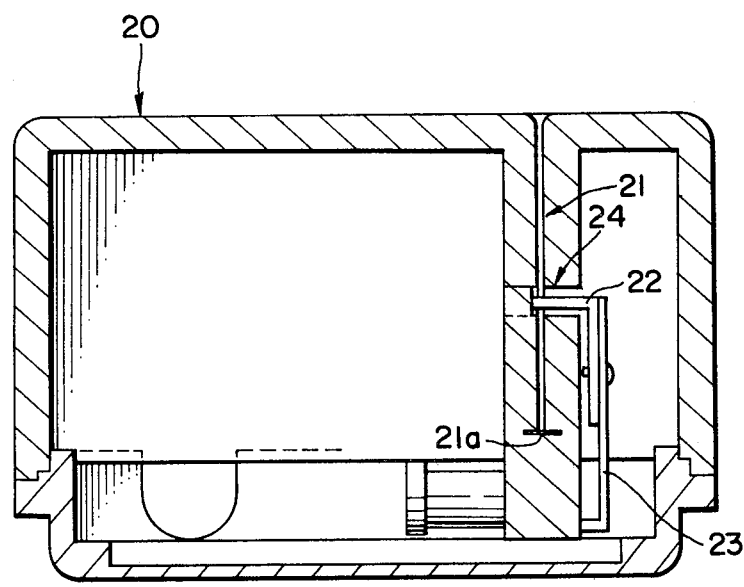
FIG. 13 is a sectional view along XIII—XIII of FIG. 12.

FIGS. 11 to 13 illustrate the fourth embodiment of the present invention. The device 20 has a magnetic card path 21 formed therein. A fixed card guide 21a is formed at the extreme depth of said card path 21. On one side of said card path there is a movable card guide 22 supported on a leaf spring 23. The tip of said movable card guide 22 is normally jutting out of the opening 24 into the card path 21, being urged by the elasticity of said leaf spring 23. At one end of said movable card guide 22 there is formed a card guide surface 22a. A magnetic card put into the card entrance 21a of the card path 21 hits against this card guide surface 22a and thereby causes said movable card guide 22 to overcome the force of the leaf spring 23 and pop out of the path 21. On the opposite side to said movable card guide 22 in the card path 21 there are arranged up and down across the movable card guide 22 the read-only head 25 and the write-only head 26 spaced from each other. The read-only head 25 is located slightly closer to the card entrance 21a than the write-only head; the reason is as explained concerning the third embodiment.

27 is a support member for the magnetic heads 25, 26. At the card entrance 21b of the card path 21 there is provided at the same level as the boss of the movable card guide 22 a control member 28 rotatably around the pivot 29 in the direction B-B'. Said control member 28 is normally urged to turn in the direction B by the force of a spring 30. To one side of said control member 28 an engage member 31 is attached to the guide bar 32 movably in vertical direction and it is normally urged to go up by the force of a compressive coil spring 33. Since one side of said control member 28 bears normally against the bend 31a of said engage member 31, said control member 28 is unable to turn in the direction B'. The pivots 29, 32 are both erected on the fixed member 34, which has a raised piece 35 formed thereon; and on said raised piece 35 is provided movably in the direction C-C' a disengage member 37 with a button 36 at the end. Between said disengage member 37 and said raised piece 35 comes a compressive coil spring 38, which normally urges said disengage member 37 to turn in the direction C.

A boss 37a is integrally formed on one side of the disengage member 37 and said boss 37a bears against the top of said engage member 31. Thus when a magnetic card is introduced at the card entrance 21b, the button 36 is pressed down to lower the engage member 31; thereupon the engage member 31 and the control member 28 are disengaged from each other; then the introduced card turns the control member 28 in the direction B' overcoming the force of the spring 30; and in consequence the card can move in the card path 21 along the fixed card guide 21a.

When an information is to be read out of a card, the card can move only along the movable card guide 22, because the control member 28 cannot turn unless the button 36 is pressed.

Figure 14:
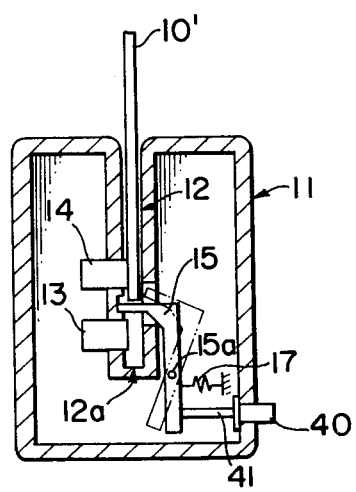
FIG. 14 is a sectional view of the principal part of the fifth embodiment of the present invention.

FIG. 14 illustrates the fifth embodiment, which is a variation of the one in FIG. 6. Like symbols in FIG. 14 denote like members in FIG. 6. Thus, 11 is the record/playback device, 12 is the magnetic card path, 12a is the fixed card guide, 13 is the write-only head, 14 is the read-only head, 15 is the movable card guide, 15a is the support point, and 17 is a tensile spring. The fifth embodiment is characterized in that there is provided a push rod 41, at one end of which is formed a button 40 and with the other end of which the lower end of the movable card guide 15 is in contact. Unless the button 40 is pressed, the movable card guide 15 remains at the solid line position in FIG. 14; and the card 10' put into the card path 12 cannot but move on along the movable card 15. When the card 10' is to be written in, the button 40 is pressed, whereupon the movable card guide 15 is caused to get out of the card path 12 against the force of the spring 17. Then the card 10' moves along the fixed card guide 12a and, upon a clock signal read by the read-only head 14, the write-only head 13 records the information with a constant density.

What is claimed is:

1. Magnetic record/playback device operated by the magnetic card on which a record/playback area and a timing signal area are formed, characterized by comprising:
    a magnetic card path formed therein;
    a fixed card guide formed in said magnetic card path;
    a movable card guide, located at a specific distance from said fixed card guide, which can pop in or out of said magnetic card path;
    a read-only magnetic head, located facing said magnetic card path over the entering position of said movable card guide;
    a write-only magnetic head located facing said magnetic card path below the entering position of said movable card guide; and
    a popping means to pop in or out said movable card guide.

2. Record/playback device of claim 1, wherein, when the movable card guide enters the magnetic card path, the card guide surface of said movable card guide and the card guide surface of the fixed card guide come to be parallel to each other.

3. Record/playback device of claim 1, wherein the movable card guide comprising a rotatable body rotating around a pivot and a spring means to urge said body normally to turn in one direction.

4. Record/playback device of claim 1, wherein said popping means comprising a solenoid provided between one end of the movable card guide and the fixed part.

5. Record/playback device of claim 1, wherein said popping means comprising a press member contacting one end of the movable card guide.

6. Record/playback device of claim 1, wherein said popping means comprising a card-introduce notch formed at the end of card-entry side of the movable card guide.

7. Record/playback device of claim 6, wherein a control member free to pop in or out of the magnetic card path is provided ahead of the card-introduce notch and said control member is equipped with a popping means to pop in or out said control member.

8. Record/playback device of claim 7, wherein the control member-popping means comprising a solenoid provided between the control member and the fixed part.

9. Record/playback device of claim 7, wherein said control member comprising a rotatable body rotating around a pivot, a spring means to urge said rotatable body to jut normally in the magnetic card path, an engage member to arrest the rotation of said rotatable body, and a press member to engage said engage member and thereby disengage said rotatable body from said engage member.

10. Record/playback device of claim 1, wherein a card-reject boss is formed at the card entrance to the magnetic card path, while a boss to engage said card-reject boss when a card moves along the fixed card guide is formed on the magnetic card.

11. Recording and reading apparatus comprising a body,
a card path in the body,
a fixed card guide on the body adjacent the card path;
a movable card guide connected to the body for positioning in and out path parallel to the fixed card guide,
a reading head, positioned in the body adjacent the path located facing said magnetic card,
a writing head positioned in the body adjacent the path and spaced from the fixed guide a distance different from the reading head,
drive means connected to the movable card guide for moving the movable guide in and out of the card path.

12. The apparatus of claim 11, wherein the movable card guide comprises a rotatable body mounted for rotating around a pivot connected to the body and wherein the drive means comprises a spring means to urge said rotatable body normally to turn in one direction.

13. The apparatus of claim 1 wherein the drive means comprises a solenoid connected between the movable card guide and the body.

14. The apparatus of claim 1 wherein the drive means comprises a push member contacting the movable card guide.

15. The apparatus of claim 1 wherein said popping means comprises a card-introduce notch formed at a card-entry end of the movable card guide.

16. The apparatus of claim 15 further comprising a control member connected to the body adjacent one end of the path ahead of the card-introduce notch, and a driving means connected to the body and the control member to move the control means in and out of the path.

17. The apparatus of claim 16 wherein the driving means comprises a solenoid connected between the control member and the body.

18. The apparatus of claim 16 wherein the control member consists of a rotatable body rotating around a pivot mounted in the body, and wherein the driving means comprises spring means connected to the body and to the rotatable body to urge said rotatable body to jut normally in the card path, an engage member connected to the body in a position adjacent the rotatable body to arrest the rotation of said rotatable body, and a press member connected to said engage member to move the engage member and thereby disengage said rotatable body from said engage member.

19. The apparatus of claim 11 wherein a card-reject boss is formed on the body at an entrance to the card path, and further comprising a card and a boss on the card along a guide.

* * * * *